US010645494B1

(12) United States Patent
Oh et al.

(10) Patent No.: US 10,645,494 B1
(45) Date of Patent: May 5, 2020

(54) ACTIVE CONTROL SYSTEM FOR A VEHICULAR DUAL MICROPHONE AND A CONTROL METHOD THEREOF

(71) Applicants: HYUNDAI MOTOR COMPANY, Seoul (KR); KIA MOTORS CORPORATION, Seoul (KR)

(72) Inventors: Hyung Suk Oh, Seoul (KR); Hong Ju Kim, Gunsan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/440,266

(22) Filed: Jun. 13, 2019

(30) Foreign Application Priority Data

Dec. 13, 2018 (KR) .................. 10-2018-0161133

(51) Int. Cl.
| | |
|---|---|
| H04R 3/00 | (2006.01) |
| G06K 9/00 | (2006.01) |
| H04R 1/40 | (2006.01) |
| G10L 15/22 | (2006.01) |
| G10L 15/25 | (2013.01) |
| G10L 15/20 | (2006.01) |
| H04R 29/00 | (2006.01) |

(52) U.S. Cl.
CPC ......... *H04R 3/005* (2013.01); *G06K 9/00335* (2013.01); *G06K 9/00838* (2013.01); *G10L 15/20* (2013.01); *G10L 15/22* (2013.01); *G10L 15/25* (2013.01); *H04R 1/406* (2013.01); *H04R 29/005* (2013.01); *H04R 2499/13* (2013.01)

(58) Field of Classification Search
USPC ........... 381/26, 71.4, 86, 112, 302, 365, 389
See application file for complete search history.

(56) References Cited

U.S. PATENT DOCUMENTS

| 8,359,058 B2 | 1/2013 | Kuwada | |
|---|---|---|---|
| 9,571,922 B2* | 2/2017 | Kwon | ............. H04R 3/005 |
| 9,747,917 B2* | 8/2017 | Tzirkel-Hancock | ... H04R 3/005 |
| 2002/0035475 A1* | 3/2002 | Yoda | ............. G10L 15/24 |
| | | | 704/270 |
| 2011/0081931 A1 | 4/2011 | Kuwada | |

FOREIGN PATENT DOCUMENTS

JP            2011077997          4/2011

* cited by examiner

*Primary Examiner* — Yosef K Laekemariam
(74) *Attorney, Agent, or Firm* — Lempia Summerfield Katz LLC

(57) ABSTRACT

An active control system of a vehicular dual microphone and a control method thereof control a beamforming area of a microphone installed adjacent to each of a driver seat and a passenger seat to be directed toward a person (utterer) who utters a voice command. The control system and method use sitting height information and seat position information of the driver or the passenger and use passenger seat riding information. The control system determines output from a mouth shape change detection unit and the user and seat position detection unit, controls microphone beamforming of the driver seat according to the determined microphone beamforming control mode, and selectively adjusts a specific microphone gain according to the determined microphone beamforming control mode to separately control microphone beamforming of the driver seat and the passenger seat.

9 Claims, 3 Drawing Sheets

ACTIVE CONTROL SYSTEM FOR A VEHICULAR DUAL MICROPHONE AND A CONTROL METHOD THEREOF

This application claims the benefit of priority to Korean Patent Application No. 10-2018-0161133, filed on Dec. 13, 2018, which is hereby incorporated by reference as if fully set forth herein.

BACKGROUND

Field of the Disclosure

The present disclosure relates to an active control system of a vehicular dual microphone and a control method thereof. More particularly, the present disclosure relates to an active control system of a vehicular dual microphone and a control method thereof for selectively controlling a beamforming area of a microphone installed around a driver seat or a passenger seat according to body information of a user, vehicle seat position information, and whether a passenger is present.

Discussion of the Related Art

In general, a microphone installed inside a vehicle is used for telephone calls while the driver is driving or for recognition of a specific command using a voice recognition program.

However, there are often is unnecessary background sounds or noises, such as mechanical or engine sounds from the vehicle or sounds that originate from the outside of the vehicle as well as sounds generated by the driver inside the vehicle.

Accordingly, in order to minimize the influence of unnecessary sounds such as surrounding mechanical or engine sounds or noises around the vehicle, two or more microphones are attached to the vehicle. Microphone beamforming is controlled using a differential comparison algorithm of differentially comparing sound signals input through different microphones and separating voice and other noises.

For example, Korean Patent Application No. 10-2015-0047981 (May 6, 2015) discloses an apparatus and method for controlling a beamforming microphone in consideration of a position of a driver seat, for enhancing call quality of a vehicular hands-free system by controlling the directional characteristics of a beamforming microphone depending on the position of the driver seat to capture driver voice to the best degree possible.

In addition, Korean Patent Publication 10-1750338 (Jun. 19, 2017) discloses a beamforming method and apparatus for recognizing an utterer voice, searching for a stored image of the utterer whose voice is recognized, searching for the utterer through a camera based on the retrieved image, recognizing a position of the retrieved utterer, and then, performing beamforming of a microphone depending on the position of the utterer.

However, in conventional technologies, because microphone beamforming is controlled in consideration of only current position information of an utterer, there is a limit in controlling microphone beamforming in consideration of the sitting height of a driver, a change in seat position, a change in posture of the driver or the passenger, and whether the passenger rides therewith. Thus, there is a limit in actively adjusting a microphone beamforming area to be directed toward the mouth of the utterer according to a variable situation of the driver or the passenger.

Therefore, according to conventional technologies, the capability for decomposing noise of a driver or a passenger is degraded, and thus, there are limitations in improving a voice recognition rate.

SUMMARY OF THE DISCLOSURE

Accordingly, the present disclosure is directed to an active control system of a vehicular dual microphone and a control method thereof that substantially obviates one or more problems due to limitations and disadvantages of the related art.

An object of the present disclosure is to provide an active control system of a vehicular dual microphone and a control method thereof, for controlling a beamforming area of a microphone installed adjacent to each of a driver seat and a passenger seat to be directed toward a person (utterer) who utters a voice command, using sitting height information and seat position information of the driver or the passenger, and passenger seat riding information.

Another object of the present disclosure is to provide an active control system of a vehicular dual microphone and a control method thereof, for controlling beamforming of two microphones that are respectively installed at the driver seat and the passenger seat to be directed toward the driver when only the driver rides in the vehicle.

Another object of the present disclosure is to provide an active control system of a vehicular dual microphone and a control method thereof, for controlling beamforming to maintain a gain of a microphone installed adjacent to an utterer at initial setting and to relatively reduce a gain of a microphone positioned away from the utterer when both the driver and the passenger ride in the vehicle.

Additional advantages, objects, and features of the disclosure are set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, an active control system of a vehicular dual microphone includes a mouth shape change detection unit installed inside a vehicle and configured to capture an image of a driver sitting on a driver seat of the vehicle and/or a passenger sitting on a passenger seat and to detect a change in a mouth shape of the driver and/or the passenger. The control system further includes a user and seat position detection unit configured to detect riding state information of the driver and/or the passenger. The control system also includes an infotainment system configured to determine a microphone beamforming control mode according to image data and user and seat position information, output from the mouth shape change detection unit and the user and seat position detection unit. The infotainment system is further configured to control microphone beamforming of the driver seat according to the determined microphone beamforming control mode. The infotainment system is also configured to selectively adjust a specific microphone gain in the determined microphone beamforming control mode to separately control microphone beamforming of the driver seat and the passenger seat. The control system also includes a microphone beamforming controller configured to adjust an installation angle of a first microphone installed adjacent to the driver seat to be directed toward the driver or installation angles of first and second microphones, which are installed adjacent to the driver seat and the passenger seat, respectively, to be respectively directed toward the driver and the passenger according to control of the infotainment system.

In another aspect of the present disclosure, an active control method of a vehicular dual microphone includes capturing an image of a driver sitting on a driver seat of a vehicle and/or a passenger sitting on a passenger seat and detecting a change in a mouth shape of the driver and/or the passenger. The method further includes detecting riding state information of the driver and/or the passenger. The method also includes determining a microphone beamforming control mode according to image data obtained by detecting the change in the mouth shape of the driver and/or the passenger and the user and seat position information, controlling microphone beamforming of the driver seat according to the determined microphone beamforming control mode, and selectively adjusting a specific microphone gain according to the determined microphone beamforming control mode to separately control microphone beamforming of the driver seat and the passenger seat. The method further includes adjusting an installation angle of a first microphone installed adjacent to the driver seat to be directed toward the driver or adjusting installation angles of first and second microphones, which are installed adjacent to the driver seat and the passenger seat, respectively, to be respectively directed toward the driver and the passenger.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
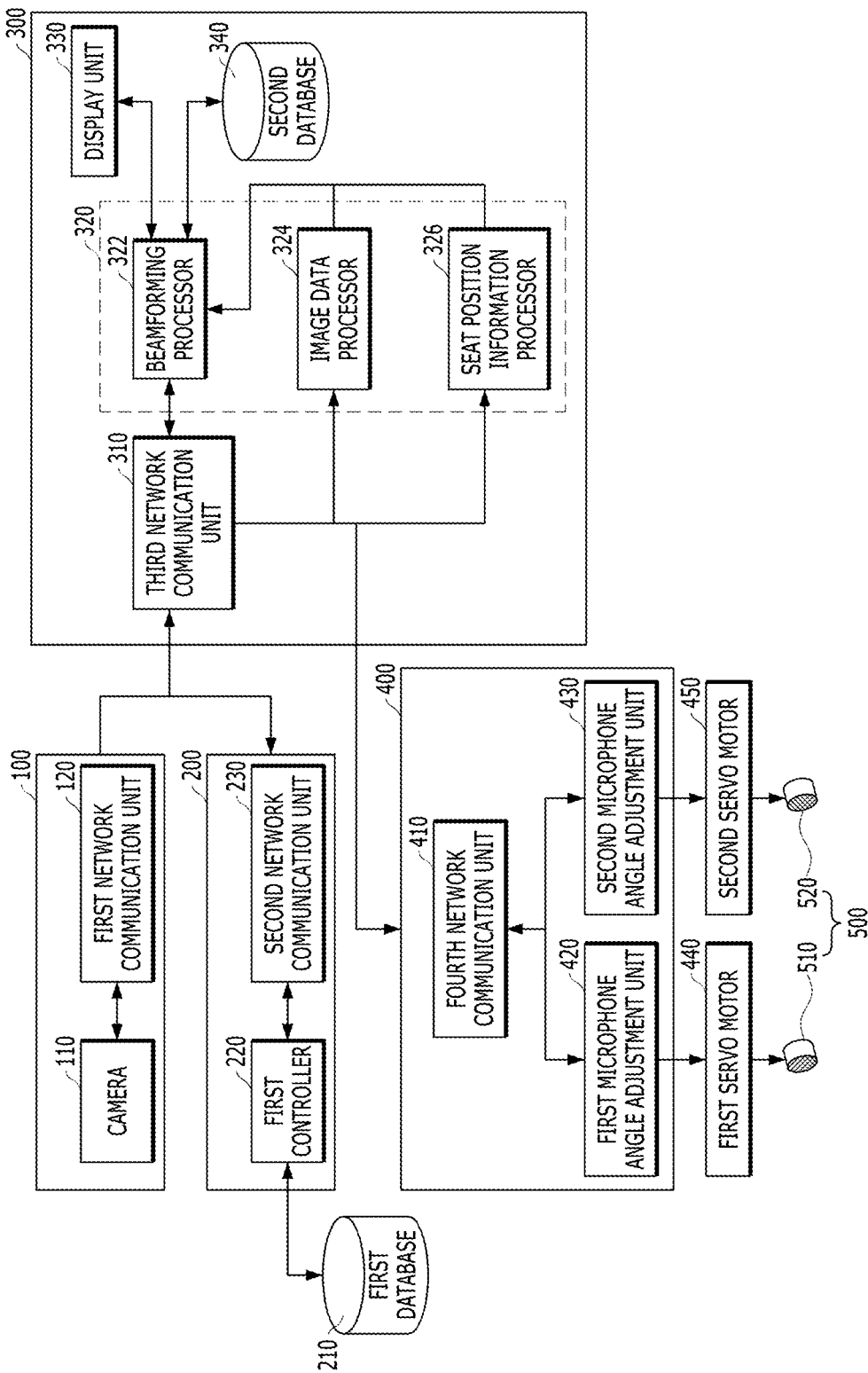
FIG. 1 is a block diagram of an active control system of a vehicular dual microphone according to an embodiment of the present disclosure.

Embodiments of the present disclosure are described in detail for those of ordinary skill in the art to easily implement the disclosure with reference to the accompanying drawings. However, the present disclosure may be implemented in various different forms and is not limited to these embodiments. To clearly describe the present disclosure, parts unrelated to the description are omitted in the drawings and like reference numerals in the specification denote like elements.

Throughout the specification, one of ordinary skill in the art would understand terms "include", "comprise", and "have" to be interpreted by default as inclusive or open rather than exclusive or closed unless expressly defined to the contrary. Further, terms such as "unit", "module", etc. disclosed in the specification mean units for processing at least one function or operation, which may be implemented by hardware, software, or a combination thereof.

Throughout the specification, when a certain part "includes" a certain component, this indicates that the part may further include another component instead of excluding another component unless there is no different disclosure. The same reference numbers are used throughout the drawings to refer to the same parts.

Hereinafter, the configuration and control procedure of an active control system of a vehicular dual microphone according to an embodiment of the present disclosure is described in detail with reference to FIGS. 1-3.

FIG. 1 is a block diagram of an active control system of a vehicular dual microphone according to an embodiment of the present disclosure.

As shown in FIG. 1, the active control system of the vehicular dual microphone according to an embodiment of the present disclosure may include a mouth shape change detection unit 100 that is installed inside a vehicle, and captures an image of a driver sitting on a driver seat of the vehicle and/or a passenger sitting on a passenger seat positioned at one side of the driver seat to detect a change in a mouth shape of the driver and/or the passenger. The control system may further include a user and seat position detection unit 200 for detecting riding state information (e.g., information on the seating height of the driver and/or the passenger, seat position information of the driver seat and/or the passenger seat of the vehicle, and information acquired by selectively combining at least one of the pieces of the passenger riding information of the passenger seat of the vehicle) of the driver and/or the passenger. The control system may also include an infotainment system 300 that determines a microphone beamforming control mode according to the image data and the user and seat position information, which are output from the mouth shape change detection unit 100 and the user and seat position detection unit 200. The infotainment system 300 may further control microphone beamforming of the driver seat according to the determined microphone beamforming control mode. The infotainment system 300 may also selectively adjust a specific microphone gain according to the determined microphone beamforming control mode to separately control microphone beamforming of the driver seat and the passenger seat. The control system may further include a microphone beamforming controller 400 that adjusts an installation angle of a first microphone 510 installed adjacent to the driver seat to be directed toward the driver or installation angles of first and second microphones 510 and 520, which are installed adjacent to the driver seat and the passenger seat, respectively, to be respectively directed toward the driver and the passenger according to control of the infotainment system 300. The control system may also include a microphone unit 500 including the first and second microphones 510 and 520 that are installed adjacent to the driver seat of the vehicle and the passenger seat positioned at a side surface of the driver seat, respectively, to receive a user voice command. Installation angles of the first and second microphones 510 and 520 are adjusted to control the microphone beamforming area according to control of the microphone beamforming controller 400.

In this embodiment, the mouth shape change detection unit 100 may include at least one camera 110 that is installed in the vehicle and captures an image of a driver sitting on the driver seat of the vehicle or a passenger sitting on the passenger seat positioned at one side of the driver seat according to control of the infotainment system 300. The detection unit 100 may further include a first network communication unit 120 for transmitting data of the image captured by the camera 110 to the outside.

The user and seat position detection unit 200 may include a first database 210 for storing and managing user and seat information using a database method according to control of the infotainment system 300. The user and seat information selectively includes sitting height information of the driver or the passenger, seat position information of the driver seat or the passenger seat of the vehicle, and passenger riding information of the passenger seat of the vehicle. The detection unit 200 may further include a first controller 220 for storing and reading the user and seat information stored in the first database 210 according to control of the infotainment system 300. The detection unit 210 may also include a second network communication unit 230 for transmitting the user and seat information to the outside according to control of the first controller 220.

The infotainment system 300 may include a third network communication unit 310 for data-communication with the mouth shape change detection unit 100, the user and seat position detection unit 200, or the microphone beamforming controller 400. The infotainment system 300 may further include a second controller 320 that determines a microphone beamforming control mode based on the riding information included in the user and seat information when a voice command for voice recognition is uttered in the vehicle and outputs a determined microphone beamforming control signal. The infotainment system 300 may also include a display unit 330 for displaying the image data and/or driving information according to control of the second controller 320. The infotainment system 300 may further include a second database 340 that stores and manages the beamforming control signal using a database method based on a predicted mouth position value of the driver obtained by considering the user and seat information. The second database 540 also reads the signal according to control of the second controller 320.

In this embodiment, the second controller may include a beamforming processor 322 that determines a microphone beamforming control mode based on the riding information included in the user and seat information. The beamforming processor 322 also outputs the beamforming control signal for directing an installation angle of the first microphone 510, installed adjacent to the driver seat, toward the driver or for respectively directing installation angles of the first and second microphones 510 and 520, which are installed adjacent to the driver seat and the passenger seat, respectively, toward the driver and the passenger according to the determined microphone beamforming control mode. The second controller 320 may further include an image data processor 324 that processes image data transmitted from the mouth shape change detection unit 100 and estimates current coordinates of the mouth using image data obtained by detecting a change in mouth position and mouth shape of the driver or the passenger who rides in the driver seat or the passenger seat. The second controller 320 may also include a seat position information processor 326 that receives the user and seat position information transmitted from the user and seat position detection unit 200. The seat position information processor 326 also separately detects the sitting height information of the driver or the passenger, the seat position information of the driver seat or the passenger seat of the vehicle, and the passenger riding information of the passenger seat of the vehicle.

In this embodiment, the infotainment system 300 may search for and acquire search information corresponding to a user voice command in response to input of the user voice command and may output the corresponding information as text information or sound information including the text information through the display unit 330 or a speaker (not shown).

The microphone beamforming controller 400 may include a fourth network communication unit 410 that receives the microphone beamforming control signal output from the third network communication unit 310 of the infotainment system 300. The microphone beamforming controller 400 may further include a first microphone angle adjustment unit 420 and a second microphone angle adjustment unit 430 which output a microphone installation angle adjustment signal for adjusting a microphone beamforming area of the driver seat or the passenger seat according to the microphone beamforming control signal output from the fourth network communication unit 410. The microphone beamforming controller 400 may also include a first servo motor 440 and a second servo motor 450 that are installed at the driver seat of the vehicle and the passenger seat positioned at the side surface of the driver seat and adjust the installation angle of the microphone unit 500, which includes at least the first or second microphone 510 or 520 with the user voice command being input thereto, in one or more arbitrary directions. The arbitrary directions may include an upward direction, a downward direction, a left direction, and a right direction, according to the microphone installation angle adjustment signal.

According to an embodiment of the present disclosure, the first and second microphones 510 and 520 may be installed in front of the driver seat and the passenger seat or on a side surface or an upper surface thereof. The first and second microphones 510 and 520 may be installed at an interval therebetween in the range of 6.8-13 cm (2.67-5.11 inches).

Hereinafter, an active control procedure of a vehicular dual microphone according to an embodiment of the present disclosure is described with reference to FIGS. 2 and 3.

Figure 2:
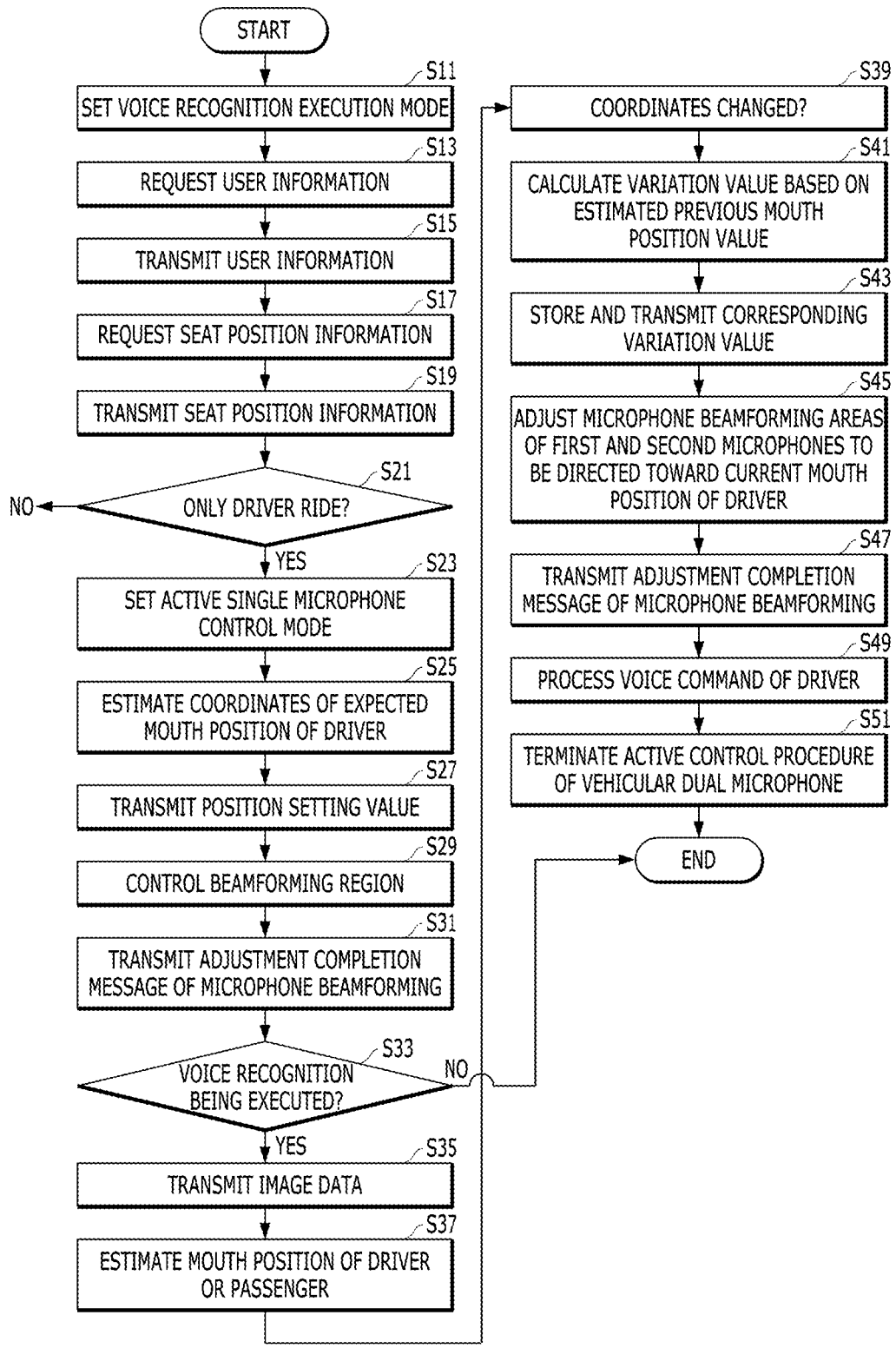
FIGS. 2 and 3 are flowcharts of an active control procedure of a vehicular dual microphone according to an embodiment of the present disclosure.

First, as shown in FIG. 2, when the vehicle is turned on, the infotainment system 300 may be automatically booted, and the user may manually push a push to track (PTT) button or may touch a 'voice recognition execution icon' displayed on the display unit 330 of the infotainment system 300 to set a voice recognition execution mode (S11).

Then, when the infotainment system 300 makes a request to the mouth shape change detection unit 100 for mouth position change information of the driver in order to control microphone beamforming of the driver seat (S13), the mouth shape change detection unit 100 may transmit image data of change information of the mouth shape of the driver to the infotainment system 300 using the camera 110 (S15).

When the infotainment system 300 makes a request to the user and seat position detection unit 200 for the riding state information (e.g., information on the seating height of the driver and/or the passenger, seat position information of the driver seat and/or the passenger seat of the vehicle, and information acquired by selectively combining at least one of pieces of the passenger riding information of the passenger seat of the vehicle) of the driver and/or the passenger, which is pre-input by the driver or the passenger (S17), the user and seat position detection unit 200 may read the driver or passenger sitting height information input by the driver or the passenger, which is stored in the first database 210, and seat information including current seat position information of the driver seat or the passenger seat and front passenger seat riding information. The detection unit 200 may further transmit the read information to the infotainment system 300 (S19).

Then, the infotainment system 300 may receive the user and seat information. The infotainment system 300 may further determine whether only the driver rides in the vehicle or both the driver and the passenger ride in the vehicle using the front passenger seat riding information included in the user and seat information. The infotainment system 300 may further determine a microphone beamforming control mode according to the determination result (S21).

In this case, as the determination result of operation S21, upon determining that only the driver rides in the vehicle, an active single microphone control mode may be set (S23).

Then, the infotainment system 300 may estimate predicted mouth position coordinates of the driver based on image data included in the current driver sitting height information and driver seat position information (S25).

Then, the infotainment system 300 may access the second database 340 that previously tunes and stores a microphone beamforming position setting value corresponding to the estimated mouth position of the driver, may read a corresponding position setting value for control of microphone beamforming, and may transmit the corresponding position setting value to the microphone beamforming controller 400 (S27).

Accordingly, the microphone beamforming controller 400 may control the beamforming area using the microphone beamforming position setting value corresponding to the mouth position of the driver of the first microphone 510 installed adjacent to the driver seat (S29).

In other words, the microphone beamforming controller 400 may separately control driving of the first and second servo motors 440 and 450 of the microphone beamforming controller 400 in order to control a beamforming area of each microphone based on the initial position setting value of microphone beamforming of the first and second microphones 510 and 520, which is transmitted from the infotainment system 300. The controller 400 may adjust the corresponding microphone beamforming area to be directed toward the driver in one or more arbitrary directions including an upward direction, a downward direction, a left direction, and a right direction.

In this case, upon completely adjusting the microphone beamforming area of the first microphone 510, the microphone beamforming controller 400 may generate an adjustment completion message of microphone beamforming and may generate the message to the infotainment system 300 (S31).

The infotainment system 300 may determine whether a current state is a state in which voice recognition is being executed in the vehicle (S33). As the determination result of operation S33, when voice recognition is being executed, the infotainment system 300 may generate a passenger image transmission request message for requesting real-time transmission of image data formed by photographing the driver and the passenger sitting in their respective seats (the driver seat and the passenger seat), to the camera 110 installed in the vehicle. The infotainment system 300 may also transmit the message to the mouth shape change detection unit 100 (S35).

Accordingly, the mouth shape change detection unit 100 that receives the corresponding passenger image transmission request message may control the camera 110 to generate the image data formed by photographing the driver and the passenger who sit in their respective seats and may transmit the image data to the infotainment system 300 in real time (S37).

Accordingly, the infotainment system 300 may estimate a position of the mouth of the driver or the passenger from the image data received in real time (S39) and may determine whether position coordinates are changed compared with an estimated initial mouth position of the driver (S41).

As the determination result of operation S41, when coordinates of the estimated current mouth position are determined to be changed, the second controller 320 of the infotainment system 300 may calculate a variation value (upper, lower, left, and right delta values) based on an estimated previous mouth position (S43). The second controller 320 may then store the corresponding variation value in the second database 340 and may also transmit the variation value to the microphone beamforming controller 400 (S45).

Accordingly, the microphone beamforming controller 400 may receive the corresponding variation value and may adjust microphone beamforming areas of the first microphone 510 installed adjacent to the driver seat and the second microphone 520 installed adjacent to the passenger seat to be directed toward the current mouth position of the driver (S47).

In other words, the microphone beamforming controller 400 may control driving of the first and second servo motors 440 and 450 to aim the microphone beamforming areas of the first and second microphones 510 and 520, information on which is transmitted from the infotainment system 300, to the current mouth position of the driver. The microphone beamforming controller 400 may adjust the corresponding microphone beamforming area in one or more arbitrary directions including upward direction, a downward direction, a left direction, and a right direction.

In this case, when the microphone beamforming areas of the corresponding first and second microphones 510 and 520 are completely adjusted, the microphone beamforming controller 400 may generate an adjustment completion message of microphone beamforming and may transmit the message to the infotainment system 300 (S49).

Then, the infotainment system 300 may remove noise from a voice that is introduced to the first and second microphones 510 and 520 and may process a voice command of the driver (S51). Then, the active control procedure of the vehicular dual microphone according to the present disclosure may be completed.

Figure 3:
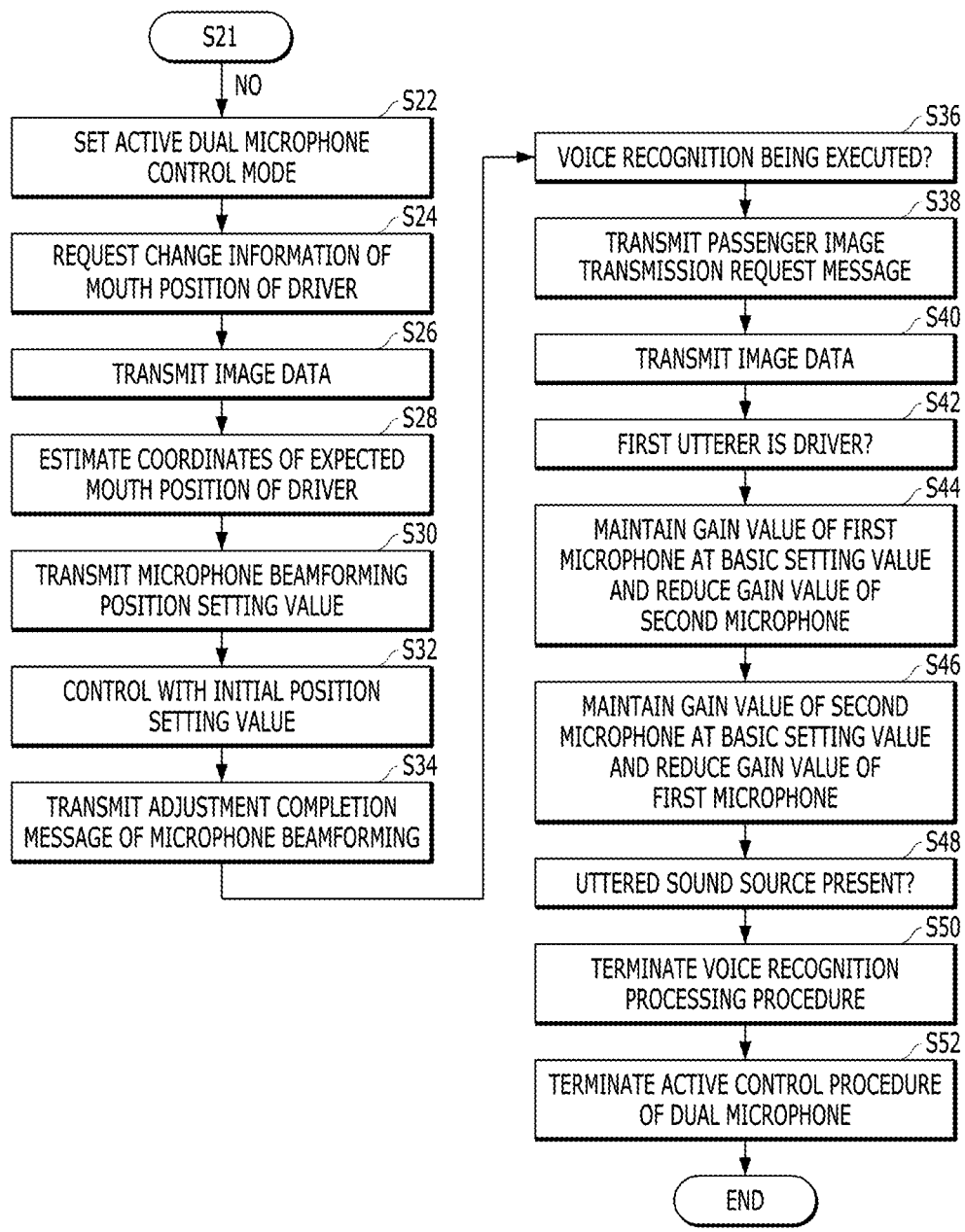

However, as the determination result of operation S17, upon determining that both the driver and the passenger are riding in the vehicle, the infotainment system 300 may set the microphone beamforming control mode to an active dual microphone control mode, as shown in FIG. 3 (S22).

Then, the infotainment system 300 may make a request to the mouth shape change detection unit 100 for mouth position change information of the driver in order to control microphone beamforming of the driver seat (S24).

Accordingly, the mouth shape change detection unit 100 may transmit image data including change information of the mouth shape of the driver to the infotainment system 300 using the camera 110 (S26).

In this case, the infotainment system 300 may estimate predicted mouth position coordinates of the driver based on image data included in current driver sitting height information and driver seat position information (S28).

Then, the infotainment system 300 may access the second database 340 that previously tunes and stores the microphone beamforming position setting value corresponding to the estimated current mouth position of the driver. The infotainment system 300 may also read the microphone beamforming position setting value corresponding to the current mouth position for control of microphone beamforming. The infotainment system 300 may further transmit the microphone beamforming position setting value to the microphone beamforming controller 400 (S30).

Accordingly, the microphone beamforming controller 400 may control the beamforming area of the first microphone 510 installed adjacent to the driver seat using an initial position setting value (S32).

In other words, the microphone beamforming controller 400 may control driving of the first or second servo motor 440 or 450 of the microphone beamforming controller 400. The microphone beamforming controller 400 may also adjust the corresponding microphone beamforming area in one or more arbitrary directions including an upward direction, a downward direction, a left direction, and a right direction to be directed toward the driver and the passenger in order to control a beamforming area of each microphone based on microphone beamforming position setting value information of the first or second microphone 510 or 520, which is transmitted from the infotainment system 300.

In this case, when the microphone beamforming area of the corresponding first or second microphone 510 or 520 is completely adjusted, the microphone beamforming controller 400 may generate an adjustment completion message of microphone beamforming and may transmit the message to the infotainment system 300 (S34).

The infotainment system 300 may determine whether a current state is a state in which voice recognition is being executed in the vehicle (S36). As the determination result of operation S36, when voice recognition is being executed, the infotainment system 300 may generate a passenger image transmission request message for requesting real-time transmission of image data formed by photographing the driver and the passenger who are sitting in their respective seats (the driver seat and the passenger seat), to the camera 110 installed in the vehicle. The infotainment system 300 may transmit the message to the mouth shape change detection unit 100 (S38).

Accordingly, the mouth shape change detection unit 100 that receives the corresponding passenger image transmission request message may control the camera 110 to generate the image data formed by photographing the driver and the passenger are sitting in their respective seats and may transmit the image data to the infotainment system 300 in real time (S40).

Accordingly, the infotainment system 300 may estimate a mouth shape of the driver or the passenger from the image data received in real time and may determine whether a first utterer is the driver or the passenger (S42).

In this case, as the determination result of operation S42, upon determining that the driver is the first utterer, the infotainment system 300 may reduce a gain value of the second microphone 520 installed adjacent to the passenger seat by 6 dB or greater based on a basic setting value while maintaining a gain value of the first microphone 510 installed adjacent to the driver seat at a basic setting value (S44). The infotainment system 300 may also increase discrimination of a sound source introduced to the first microphone 510 installed adjacent to the driver seat.

In this case, the infotainment system 300 may reduce a gain of the second microphone 520 installed adjacent to the passenger seat to a level equal to or less than 25% of the basic setting value. The infotainment system 300 may lower a sound source signal introduced to the second microphone 520 to a surrounding noise level to prevent a sound source from being introduced to the second microphone 520 installed adjacent to the passenger seat if possible.

However, as the determination result of operation S42, upon determining that the passenger is the first utterer, the infotainment system 300 may reduce a gain value of the first microphone 510 installed adjacent to the driver seat by dB or greater based on a basic setting value while maintaining a gain value of the second microphone 520 installed adjacent to the passenger seat at a basic setting value (S46). The infotainment system 300 may increase discrimination of a sound source introduced to the second microphone 520 installed adjacent to the passenger seat.

In this case, the infotainment system 300 may reduce a gain of the first microphone 510 installed adjacent to the driver seat to a level equal to or less than 25% of the basic setting value. The infotainment system 300 may lower a sound source signal introduced to the first microphone 510 to a surrounding noise level to prevent a sound source from being introduced to the first microphone 510 installed adjacent to the driver seat if possible.

Then, the infotainment system 300 may detect a sound pressure level (voltage level) of an uttered sound source introduced to the first or second microphone 510 or 520 that is maintained at a basic microphone gain setting value with a preset period. The infotainment system 300 may determine whether an uttered sound source is present (S48).

In this case, as the determination result, when there is no change in a sound pressure level, the infotainment system 300 may terminate a voice recognition processing procedure (S50). However, when a sound source input to a specific microphone is present (when a change in a sound pressure level is detected), the infotainment system 300 may process a voice command introduced to the corresponding microphone and may then terminate the active control procedure of the vehicular dual microphone.

In the aforementioned active control system of the vehicular dual microphone and a control method thereof according to the present disclosure, a beamforming area of a microphone installed adjacent to each of the driver seat and the passenger seat may be controlled to be directed toward a person (utterer) who transmits a voice command using sitting height information and seat position information of a driver or a passenger, and passenger seat riding information. Thus, a voice recognition rate of the driver may be advantageously increased.

When only a driver rides in a vehicle, beamforming of two microphones that are respectively installed at the driver seat and the passenger seat may be controlled to be directed toward the driver. When both the driver and the passenger ride in the vehicle, beamforming may also be controlled to maintain a gain of a microphone installed adjacent to an utterer at an initial setting and to relatively reduce a gain of a microphone positioned away from the utterer. Thus, the capability for decomposing the voice of the driver or the passenger and the noise may be advantageously enhanced.

In the above configured active control system of the vehicular dual microphone and a control method thereof according to the present disclosure, a beamforming area of a microphone installed adjacent to each of the driver seat and the passenger seat may be controlled to be directed toward a person (utterer) who transmits a voice command using sitting height information and seat position information of a driver or a passenger, and passenger seat riding information. Thus, a voice recognition rate of the driver may be increased.

When only a driver rides in a vehicle, beamforming of two microphones that are respectively installed at the driver seat and the passenger seat may be controlled to be directed toward the driver. When both the driver and the passenger ride in the vehicle, beamforming may also be controlled to maintain a gain of a microphone installed adjacent to an utterer at initial setting and to relatively reduce a gain of a microphone positioned away from the utterer. Thus, the capability for decomposing voice of the driver or the passenger and noise may be enhanced.

It will be appreciated by persons having ordinary skill in the art that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those having ordinary skill in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An active control system of a vehicular dual microphone, the system comprising:
   a mouth shape change detection unit installed inside a vehicle and configured to capture an image of a driver sitting on a driver seat of the vehicle and/or a passenger sitting on a passenger seat and to detect a change in a mouth shape of the driver and/or the passenger;
   a user and seat position detection unit configured to detect riding state information of the driver and/or the passenger;
   an infotainment system configured to determine a microphone beamforming control mode according to image data and user and seat position information, output from the mouth shape change detection unit and the user and seat position detection unit, to control microphone beamforming of the driver seat according to the determined microphone beamforming control mode, and to selectively adjust a specific microphone gain according to the determined microphone beamforming control mode to separately control microphone beamforming of the driver seat and the passenger seat; and
   a microphone beamforming controller configured to adjust an installation angle of a first microphone installed adjacent to the driver seat to be directed toward the driver or installation angles of the first microphone and a second microphone, which are installed adjacent to the driver seat and the passenger seat, respectively, to be respectively directed toward the driver and the passenger according to control of the infotainment system,
   wherein the infotainment system controller includes a beamforming processor configured to
      determine the microphone beamforming control mode based on the riding information included in the user and seat information, and
      when only the driver rides in the vehicle, output a beamforming control signal for directing an installation angle of the first microphone, installed adjacent to the driver seat, toward the driver, or
      when both the driver and the passenger ride in the vehicle, output a beamforming control signal for respectively directing installation angles of the first and second microphones, which are installed adjacent to the driver seat and the passenger seat, respectively, toward the driver and the passenger.

2. The system of claim 1, wherein the mouth shape change detection unit includes:
   at least one camera installed in the vehicle and configured to capture an image of a driver sitting on the driver seat of the vehicle or a passenger sitting on the passenger seat positioned at one side of the driver seat according to control of the infotainment system; and
   a first network communication unit configured to transmit data of the image captured by the camera to the outside.

3. The system of claim 1, wherein the riding state information includes information on a seating height of the driver and/or the passenger, seat position information of the driver seat and/or the passenger seat of the vehicle, and information acquired by selectively combining at least one of pieces of the passenger riding information of the passenger seat of the vehicle.

4. The system of claim 1, wherein the user and seat position detection unit includes:
   a first database configured to store and manage user and seat information, which selectively includes sitting height information of the driver or the passenger, seat position information of the driver seat or the passenger seat of the vehicle, and passenger riding information of the passenger seat of the vehicle, using a database method according to control of the infotainment system;
   a first controller configured to store or read the user and seat information stored in the first database according to control of the infotainment system; and
   a second network communication unit configured to transmit the user and seat information to the outside according to control of the first controller.

5. The system of claim 1, wherein the infotainment system includes:
   a third network communication unit configured to data-communicate with the mouth shape change detection unit, the user and seat position detection unit, or the microphone beamforming controller;
   a second controller configured to determine a microphone beamforming control mode based on the riding information included in the user and seat information when a voice command for voice recognition is uttered in the vehicle and to output a determined microphone control signal;
   a display unit configured to display the image data and/or driving information according to control of the second controller; and
   a second database configured to store and manage the beamforming control signal using a database method based on a predicted mouth position value of the driver, obtained by considering the user and seat information, and to read the signal according to control of the second controller.

6. The system of claim 5, wherein the second controller includes:
   the beamforming processor configured to determine a microphone beamforming control mode based on the riding information included in the user and seat information and to output a beamforming control signal for directing an installation angle of the first microphone, installed adjacent to the driver seat, toward the driver or to output a beamforming control signal for respectively directing installation angles of the first and second microphones, which are installed adjacent to the driver seat and the passenger seat, respectively, toward the driver and the passenger according to the determined microphone beamforming control mode;

an image data processor configured to process image data transmitted from the mouth shape change detection unit and to detect a change in a mouth position and a mouth shape of the driver or the passenger who rides in the driver seat or the passenger seat; and a seat position information processor configured to receive the user and seat position information transmitted from the user and seat position detection unit and to separately detect sitting height information of the driver or the passenger, seat position information of the driver seat or the passenger seat of the vehicle, and passenger riding information of the passenger seat of the vehicle.

7. The system of claim 1, wherein the microphone beamforming controller includes:

a fourth network communication unit configured to receive a microphone beamforming control signal output from the infotainment system;

first and second microphone angle adjustment units configured to output a microphone installation angle adjustment signal for adjusting a microphone beamforming area of the driver seat or the passenger seat according to the microphone beamforming control signal output from the fourth network communication unit; and first and second servo motors installed at the driver seat of the vehicle and the passenger seat of the vehicle and configured to adjust the installation angle of a microphone unit including at least the first or second microphone with a user voice command being input thereto, in one or more arbitrary directions of an upward direction, a downward direction, a left direction, and a right direction, according to the microphone installation angle adjustment signal.

8. An active control method of a vehicular dual microphone, the method comprising:

capturing an image of a driver sitting on a driver seat of a vehicle and/or a passenger sitting on a passenger seat and detecting a change in a mouth shape of the driver and/or the passenger;

detecting riding state information of the driver and/or the passenger;

determining a microphone beamforming control mode according to image data obtained by detecting the change in the mouth shape of the driver and/or the passenger and the user and seat position information, controlling microphone beamforming of the driver seat according to the determined microphone beamforming control mode, and selectively adjusting a specific microphone gain according to the determined microphone beamforming control mode to separately control microphone beamforming of the driver seat and the passenger seat; and adjusting an installation angle of a first microphone installed adjacent to the driver seat to be directed toward the driver or adjusting installation angles of first and second microphones, which are installed adjacent to the driver seat and the passenger seat, respectively, to be respectively directed toward the driver and the passenger, wherein the determining a microphone beamforming control mode includes when only the driver rides in the vehicle, outputting a beamforming control signal for directing an installation angle of the first microphone, installed adjacent to the driver seat, toward the driver, or when both the driver and the passenger ride in the vehicle, outputting a beamforming control signal for respectively directing installation angles of the first and second microphones, which are installed adjacent to the driver seat and the passenger seat, respectively, toward the driver and the passenger.

9. The method of claim 8, further comprising:

upon determining that the driver is a first utterer, reducing a gain value of the second microphone by a preset gain value or greater based on a basic setting value while maintaining a gain value of the first microphone at a basic setting value; and upon determining that the passenger is the first utterer, reducing a gain value of the first microphone by a preset gain value or greater based on a basic setting value while maintaining a gain value of the second microphone at a basic setting value.

\* \* \* \* \*